C. C. BLAKE.
CLUTCH.
APPLICATION FILED SEPT. 1, 1917.

1,394,805.

Patented Oct. 25, 1921.
2 SHEETS—SHEET 1.

Inventor
Charles C. Blake
by Charles W. McDermott
his attorney

C. C. BLAKE.
CLUTCH.
APPLICATION FILED SEPT. 1, 1917.

1,394,805.

Patented Oct. 25, 1921.
2 SHEETS—SHEET 2.

UNITED STATES PATENT OFFICE.

CHARLES C. BLAKE, OF BROOKLINE, MASSACHUSETTS.

CLUTCH.

1,394,805.  Specification of Letters Patent.  Patented Oct. 25, 1921.

Application filed September 1, 1917. Serial No. 189,353.

*To all whom it may concern:*

Be it known that I, CHARLES C. BLAKE, a citizen of the United States, residing at Brookline, in the county of Norfolk and State of Massachusetts, have invented certain Improvements in Clutches, of which the following description, in connection with the accompanying drawings, is a specification, like reference characters on the drawings indicating like parts in the several figures.

This invention relates to clutches and aims to devise a simple and efficient form of clutch which will be thoroughly reliable in operation, which can be economically manufactured, which will be compact and in which the parts of the clutch subject to wear and deterioration can be easily and cheaply replaced. To this end the invention involves a novel organization of elements and includes certain combinations and arrangements of parts and details of construction which will be readily understood from the following description and the novel features of which will be pointed out in the appended claims.

Referring now to the accompanying drawings.

Figure 1:
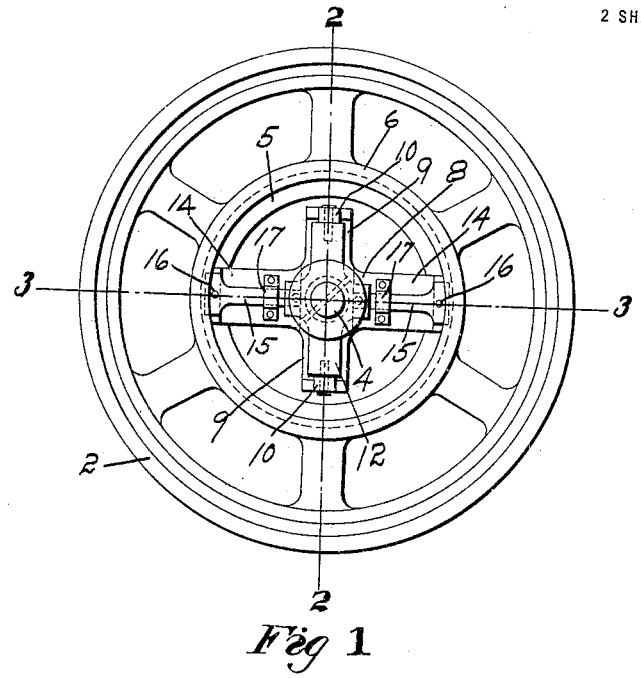
Figure 1 is an end elevation of a clutch embodying the present invention.
Figures 2, 3:
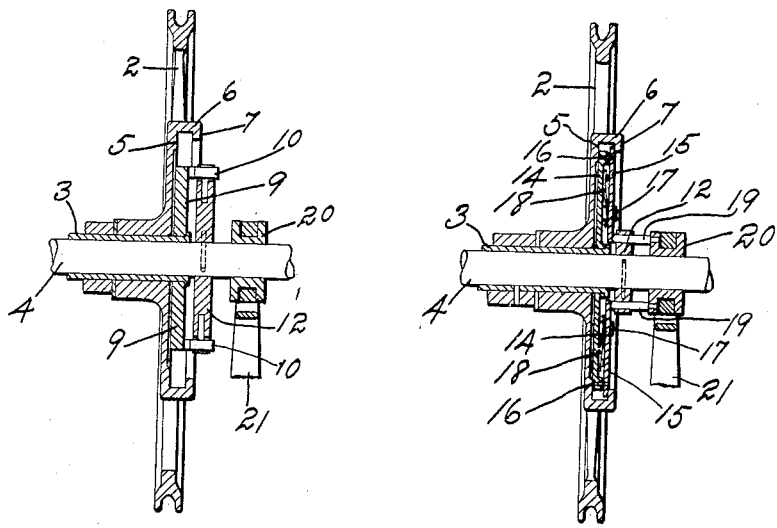
Fig. 2 is a vertical cross sectional view on the line 2—2, Fig. 1.
Fig. 3 is a horizontal cross sectional view on the line 3—3, Fig. 1.

The clutch shown in Figs. 1 to 3, inclusive, comprises a pulley 2 mounted to rotate freely on a sleeve or bushing 3 in which a shaft 4 is rotatably mounted. The pulley 2 has a hub or clutch portion on which a friction face 5 is formed and which also includes a cylindrical part 6 extending substantially parallel to the axis of rotation of the pulley and an inturned portion 7 provided with a friction face on its inner side, that is, next to the friction face 5 so that the two friction faces are opposed to each other.

Coöperating with the clutch member formed on the pulley is another clutch member which includes a spider 8 mounted to rotate freely on the bushing 3 but arranged to rotate with the shaft 4. For this purpose the spider 8 is provided with two arms 9, each of which terminates in an upturned fork that receives a roll 10, these rolls being mounted at the opposite ends of a transverse piece 12 which is pinned to the shaft 4.

The spider 8 also has two arms 14 extending into the space between the friction face 5 and the overhanging part 7. Two levers 15 are connected to the members 14 of the spider 8 by screws or pins 16 which preferably extend loosely through the outer end portions of the levers. As clearly shown in Fig. 3, the outer end of each lever 15, that is, the end farthest from the axis of rotation, is arranged to bear on one side against the inner friction face of the overhanging part 7 and engages, at its opposite side, the rounded end portion of its respective arm 14. The connection between each lever 15 and its corresponding arm enables the lever to swing slightly or fulcrum on the rounded part of the arm. Two U-shaped straps 17 coöperate with the screws 16 to hold the levers 15 in their proper positions on the arms 14, but enable the levers to have the swinging movement above mentioned, and a spring 18 is interposed between each arm and its respective lever and tends to move the inner ends of the levers away from the spider 8. The movement of the levers in the opposite direction is produced by pins 19 carried by a collar 20 that is mounted loosely on the shaft 4. These pins project through holes in the part 12, which serve to maintain them in the correct relationship to the levers 15, and they bear against the inner ends of the levers 15. A lever 21 is constructed to straddle the collar 20 and carries pins that project into the opposite sides of a ring mounted loosely in a groove in the collar 20 so that a swinging movement of this lever moves the collar 20 longitudinally of the shaft 4.

It will now be understood that normally the springs 18 hold the levers 15 in positions approximately parallel to the spider and that while the parts are so positioned the pulley 2 is disconnected from the other clutch member. When it is desired to couple the shaft 4 and pulley 2 together, the lever 21 is moved in a direction causing it to force the collar 20 and pins 19 toward the left, as the parts are shown in Fig. 3. This movement swings the levers 15 about their fulcrums and forces their outer ends hard against the inner friction face of the part 7. This movement also crowds the arms 14 against the friction face 5 of the pulley and thus locks the driving and driven parts frictionally together. It will be noted that the levers 15 engage the parts 7 at points so close to their fulcrums that the pressure applied to them through the pins 19 is greatly multiplied and a very firm clutching engagement between the driving and driven members thus is produced. Preferably the levers 15 are made of suitable material, such for instance as steel, and of such dimensions that they will spring somewhat under the pressure of the pins 19. The clutching engagement of the driving and driven members thus will be yieldingly effected and the driving connection between the two clutch parts thereof can be produced very gradually.

By moving the lever 21 to the right, Fig. 3, the pressure of the pins 19 on the inner ends of the levers 15 will be relieved and the springs 18 will return the levers to their original positions, thus interrupting the engagement of the parts 14 and 15 with the parts 5 and 7 of the pulley, and throwing out the clutch. While power ordinarily is applied to the pulley 2 and this part thus usually constitutes the driving member, it is obvious that the shaft 4 could be utilized as the driving member and the pulley 2 as the driven member, if that arrangement were found more convenient.

Figure 4:
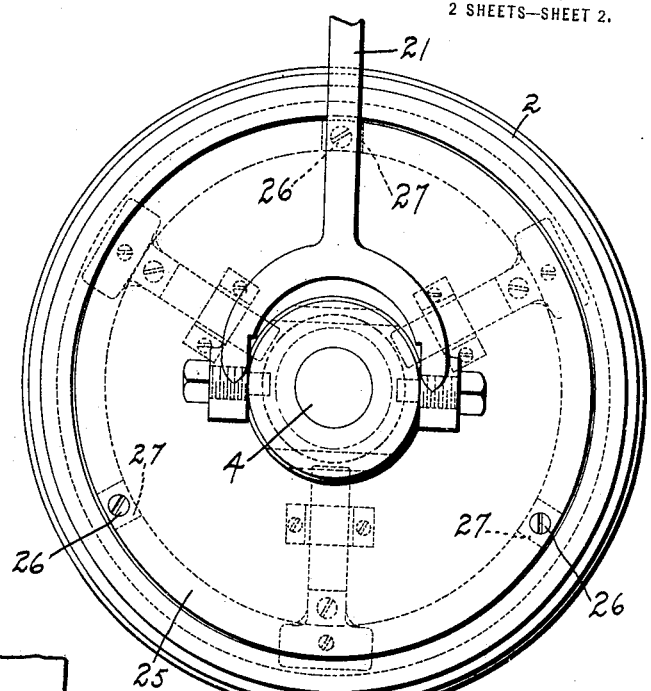
Fig. 4 is an end elevation of a modified construction.
Figure 5:
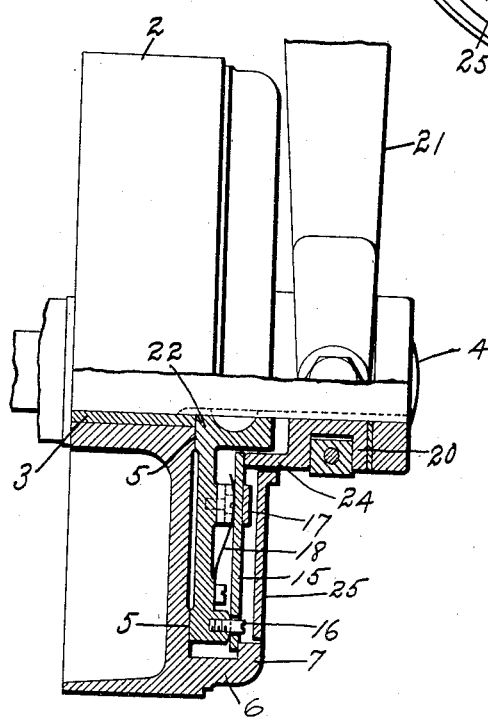
Fig. 5 is a side elevation, partly in cross section, of the construction shown in Fig. 4.

The modification shown in Figs. 4 and 5 is essentially like the construction shown in Figs. 1, 2 and 3, but differs in details of mechanical design. In Figs. 4 and 5 the parts corresponding to those shown in Figs. 1, 2 and 3 are designated by the same reference numerals as those used in the latter figures.

In this arrangement a disk 22 is used instead of the spider 8 and three radial levers 15 are mounted on this disk in substantially the same manner that the corresponding levers are mounted on the spider 8 of the construction shown in Figs. 1, 2 and 3. The disk 22 is splined on the shaft 4 so that it can slide toward and from the friction face 5 of the pulley 2. In the arrangement shown in Figs. 4 and 5, however, the collar 20 is provided with a sleeve 24 which incloses the hub of the disk 22 and bears against the inner ends of the spring levers 15. The operation of this clutch is exactly the same as that previously described. In order to inclose the clutch parts, a cover plate 25 is shaped to fit in the annular space between the sleeve 24 and the part 7 of the pulley and is held in place by screws 26 which secure it to bosses 27, Fig. 4, formed on the disk 22.

The clutch provided by this invention is exceedingly simple in construction and is remarkably compact in proportion to the power that it is capable of transmitting. While the parts of the clutch are subject to relatively slow wear it is so constructed that the parts most liable to wear out can be easily and cheaply replaced.

While I have herein shown and described the best embodiment of the invention of which I am at present aware, it is obvious that the invention may be embodied in many other forms, while still retaining its essential features and characteristics. The present application is a continuation of my application Serial No. 113,725, filed August 8, 1916, so far as the subject matter common to the two applications is concerned.

What is claimed as new is:

1. A clutch, having, in combination, rotary driving and driven members, one of said members having a pair of clutch faces, a plurality of spring levers carried by the other member extending outwardly away from the axis of rotation of said members, each of said levers being fulcrumed near its outer end, means for swinging said levers on their fulcrums in one direction to cause them to engage one of the clutch faces and force the member on which they are mounted into frictional engagement with the other clutch face, spring means for swinging said levers in the opposite direction to maintain the clutch normally released, and a strap coöperating with each of said levers to limit its movement under the influence of said spring means.

2. A clutch, having, in combination, a rotary driving member, a rotary driven member, said members being mounted for clutching engagement with each other, a plurality of spring levers fulcrumed on one of said members and arranged to engage the other member at points close to their fulcrums, said parts being constructed and arranged to cause the movement of said levers on their fulcrums in one direction to force said rotary members into clutching engagement with each other, means for moving said levers on their fulcrums, a spring between each of said levers and the member on which the levers are mounted acting normally on the levers to hold them in their clutch releasing positions, and means for limiting the movement of the levers produced by said springs.

In testimony whereof I have signed my name to this specification.

CHARLES C. BLAKE.